J. W. GANNON & W. S. WEBBER.
VEHICLE TIRE.
APPLICATION FILED JULY 20, 1914.
1,118,757.
Patented Nov. 24, 1914.
2 SHEETS—SHEET 1.
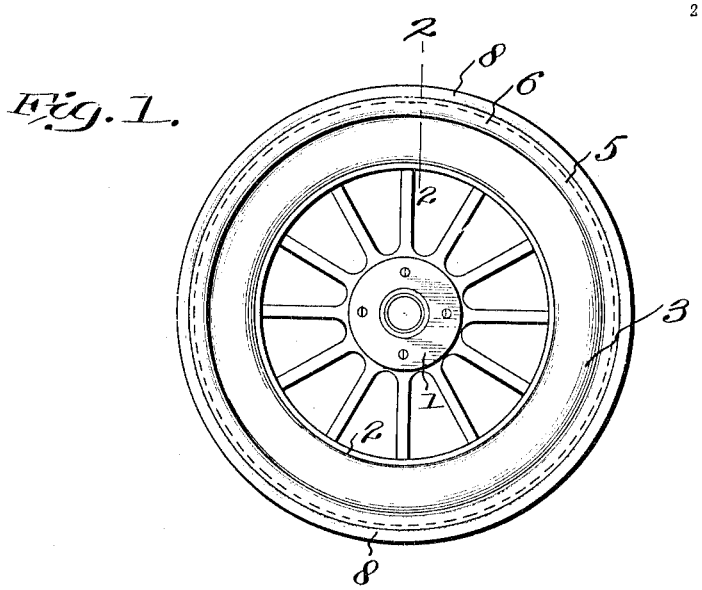
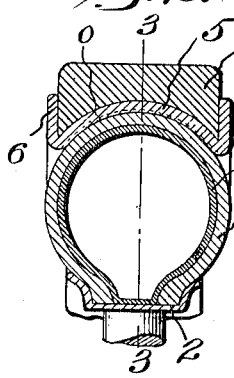
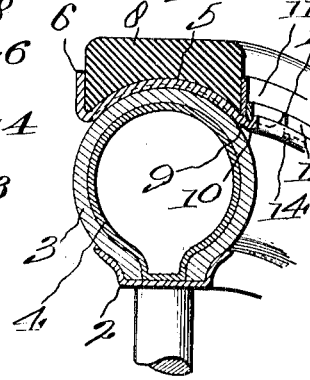
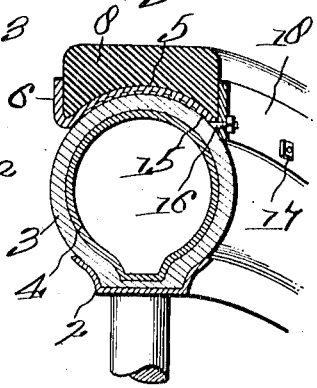
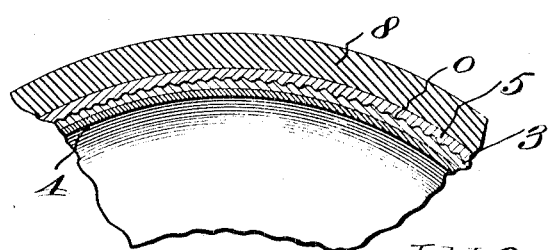
Witnesses
Inventors
J. W. Gannon, and
W. S. Webber,
by Wilkinson, Fisher & MacKaye,
Attorneys.

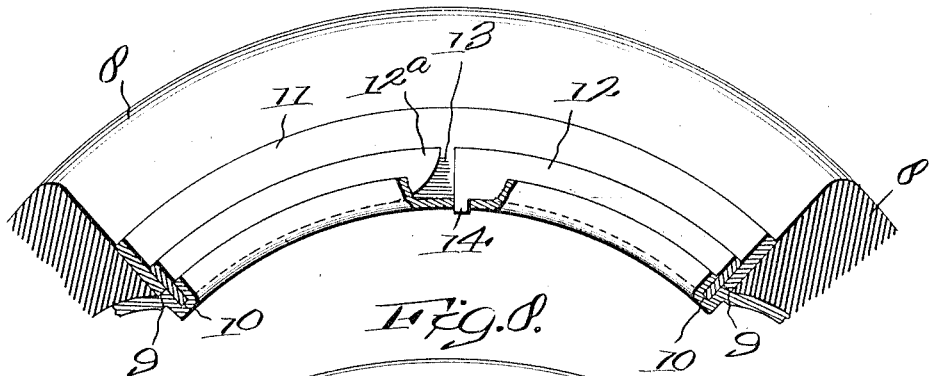
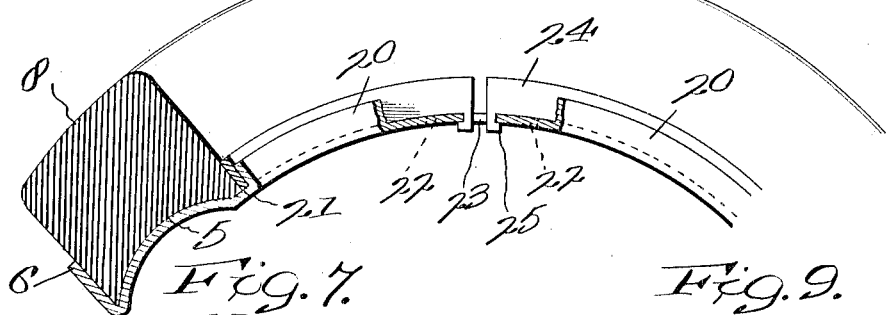
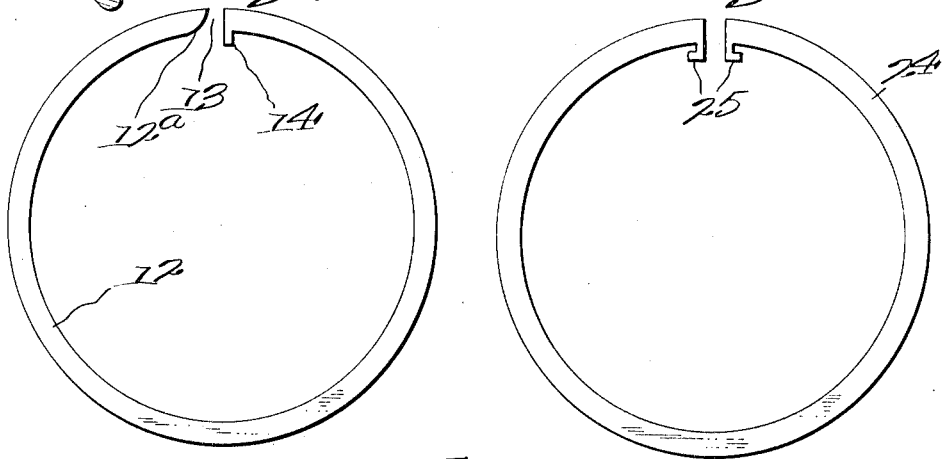
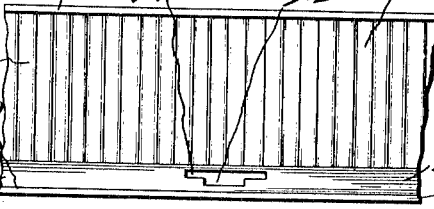

UNITED STATES PATENT OFFICE.

JOHN W. GANNON AND WILLIAM S. WEBBER, OF MONTGOMERY, ALABAMA.

VEHICLE-TIRE.

1,118,757.     Specification of Letters Patent.     Patented Nov. 24, 1914.

Application filed July 20, 1914. Serial No. 851,945.

*To all whom it may concern:*

Be it known that we, JOHN W. GANNON and WILLIAM S. WEBBER, citizens of the United States, residing at Montgomery, in the county of Montgomery and State of Alabama, have invented certain new and useful Improvements in Vehicle-Tires; and we do hereby declare the following to be a full, clear, and exact description of the invention, such as will enable others skilled in the art to which it appertains to make and use the same.

Our invention relates to improvements in vehicle tires, and consists in providing a puncture-proof shield which may be readily applied to the treads of pneumatic tires of ordinary construction, whereby the life of the pneumatic tire may be indefinitely prolonged, with the corresponding saving of time, trouble and expense.

Our invention will be understood by reference to the accompanying drawings, in which:—

Figure 1 is a side elevation of a wheel fitted with a pneumatic tire having the herein described shield mounted thereon; Fig. 2 shows a section along the line 2—2 of Fig. 1; Fig. 3 shows a section along the line 3—3 of Fig. 2, but on a larger scale; Fig. 4 shows a cross section through the tire, and illustrates a modified form of the device; Fig. 5 is a similar view to Fig. 4, and shows another modification; Fig. 6 is a side elevation, on a larger scale, of part of the apparatus shown in Fig. 4; Fig. 7 is a detail view showing the locking ring of Figs. 4 and 6; Fig. 8 is a similar view to Fig. 6, but shows a further modification; Fig. 9 is a detail view showing the locking ring of Fig. 8; and Fig. 10 is a plan view of a portion of the metal trough of Fig. 8, the rubber shoe and locking ring being omitted.

Referring first to Figs. 1, 2 and 3, 1 represents the hub of the wheel, 2 the permanent rim mounted on the felly band, 3 the ordinary pneumatic tire, 4 the inner tube, and 5 the annular trough curved to fit the contour of the tread of the pneumatic tire, and having the outwardly-extending flanges 6 to hold in place the solid rubber shoe 8, which is mounted in said trough, as shown in Fig. 2. The trough 5 is preferably made of a single piece of metal, having the ends welded or otherwise fastened together. The inner surface of this trough is preferably roughened, or corrugated, as at O, to engage the corresponding surface of the tread of the tire 3. For ordinary purposes, it would not be necessary to especially construct the pneumatic tire to fit the annular trough surrounding same, as the slight roughening, or corrugations, on the inner surface of the trough will hold the tire shield against creeping; but, if desired, the rubber may be molded to correspond with corrugations provided in the inner wall of the trough, as shown in Fig. 3. In order to fit the device in place, deflate the tire 3, slip on the annular shoe, or shield, and then inflate the tire 3 in the usual way, and the parts will be assembled as in Fig. 2. The solid rubber 8 will serve as an auxiliary tread, and the trough 5 will protect the tire 3 and inner tube 4 against being perforated, as also against being worn from contact with the roadbed.

In the modification shown in Figs. 4, 6 and 7, the metal trough has the side flange 6 similar to those flanges already described, but on the opposite side is provided with a shelf 9 and a groove 10. Upon this shelf 9 the holding ring 11 engages, and in this groove the locking ring 12 projects, as shown most clearly in Fig. 6. The ring 11 is formed of a flat band which slips over the outer edge of the trough, and also over the shelf 9, as shown in Fig. 6. The locking ring 12 is broken, as at 13, and one end of said ring is preferably rounded slightly, as at 12ª, see Fig. 6; while the other end is provided with a lug 14 which projects down into a hole at the bottom of the groove 10, see Fig. 6. In assembling the parts, the rubber shoe 8 is slipped over the arcuate portion 5 of the trough until one edge bears against the side flange 6. The ring 11 is then put in position, then the lug 14 of the ring 12 is inserted in the corresponding notch of the trough, and this ring is worked down into the groove 10, as shown in Fig. 6. To disassemble the parts, pry out the end 12ª of the ring 12, then work said ring loose from engagement with the groove 10, and finally remove the lug 14 from its notch and the ring 12 may be removed from the device; then take off the ring 11 and the shoe 8 may be removed.

In the form of device shown in Fig. 5, one side of the trough 5 is provided with a side flange 6, while the other side 15 of said trough is provided with bolts 16, having nuts 17, by means of which an auxiliary side flange 18 may be attached to said trough, thus firmly holding the shoe 8 in place.

In the form of device shown in Figs. 8, 9 and 10, the side flange 20 of the trough is slightly shallower than the side flange 6, so that the shoe 8 may be slipped over the same; and adjacent to this side flange 20 there is a shelf 21 for the locking ring 24. Cut in this shelf 21 is an elongated slot 22, having a shorter side portion 23, as shown in Figs. 8 and 10. The locking ring 24 has hooked-shaped lugs 25, as shown in Figs. 8 and 9, which may be conveniently engaged in the slot 22, and which, when said ring is compressed, will register with the slot 23, and when so registering, if pressure be placed on the shoe 8, these lugs will be pressed outward and locked in the shorter section 23 of said slot, as shown in Fig. 8. This locking ring is thereupon automatically locked in position by the lateral pressure on the shoe. To disassemble the parts, press the ends of the ring 24 inward toward the center of the shoe and then pry one of the ends of the ring out of engagement with the flange 20 and remove the ring, when the shoe may be sprung out of engagement with the trough.

In Fig. 10 we have shown the bottom of the trough as corrugated, so as to prevent the creeping of the shoe 8 around the trough 5.

We thus provide in Figs. 1, 2 and 3 a shield for pneumatic tires comprising a metal trough and an elastic shoe made of rubber, or other similar material, inclosed therein; while in Figs. 4–10 we have shown means whereby this rubber shoe may be conveniently removed from the trough.

The improved shield should be made of sizes to correspond to the standard types of tires, and should fit snugly over the pneumatic tire, so that when the latter is distended it will be firmly held in place, both against lateral displacement and against creeping.

It will be seen that we provide a detachable shield for use with pneumatic tires which may be readily removed and replaced when desired, and which effectually protects the tire from the wear of the road, and from punctures, thus indefinitely prolonging the life of the tire.

Having thus described our invention, what we claim and desire to secure by Letters Patent of the United States is:—

A detachable shield for pneumatic tires, comprising an annular metal trough having an arcuate bottom and a fixed side flange on one side thereof, and a detachable locking ring secured to the other side thereof, with a filling of rubber or similar material projecting beyond the outer edge of said flange and said locking ring, the inner face of said arcuate bottom of said annular trough being transversely corrugated to engage the exterior surface of the pneumatic tire, substantially as described.

In testimony whereof we affix our signatures, in presence of two witnesses.

JOHN W. GANNON.
WILLIAM S. WEBBER.

Witnesses:
 JAS. BALDWIN,
 J. T. WARNER, Jr.